(12) United States Patent
Hagopian

(10) Patent No.: US 12,180,090 B2
(45) Date of Patent: Dec. 31, 2024

(54) SEPTIC TANK FILTER SYSTEM

(71) Applicant: Robert Gregory Hagopian, Kingston, NY (US)

(72) Inventor: Robert Gregory Hagopian, Kingston, NY (US)

(*) Notice: Subject to any disclaimer, the term of this patent is extended or adjusted under 35 U.S.C. 154(b) by 480 days.

(21) Appl. No.: 17/647,085

(22) Filed: Jan. 5, 2022

(65) Prior Publication Data
US 2023/0212029 A1 Jul. 6, 2023

(51) Int. Cl.
| | |
|---|---|
| *C02F 1/00* | (2023.01) |
| *B01D 29/00* | (2006.01) |
| *B01D 29/05* | (2006.01) |
| *B01D 29/23* | (2006.01) |
| *B01D 29/56* | (2006.01) |

(Continued)

(52) U.S. Cl.
CPC .......... *C02F 1/001* (2013.01); *B01D 29/0097* (2013.01); *B01D 29/05* (2013.01); *B01D 29/23* (2013.01); *B01D 29/232* (2013.01); *B01D 29/56* (2013.01); *B01D 29/58* (2013.01); *B01D 35/30* (2013.01); *B01D 2201/0415* (2013.01)

(58) Field of Classification Search
CPC .... C02F 1/001; C02F 1/004; C02F 2203/006; C02F 3/288; B01D 29/0097; B01D 29/05; B01D 29/23; B01D 29/232; B01D 29/56; B01D 29/58; B01D 35/30; B01D 2201/0415; B01D 29/90; B01D 29/908; B01D 29/92
USPC ...................... 210/256, 513, 532.2, 533–537
See application file for complete search history.

(56) References Cited

U.S. PATENT DOCUMENTS

| | | | |
|---|---|---|---|
| 664,532 A | 12/1900 | Church | |
| 4,505,813 A * | 3/1985 | Graves | C02F 3/205 |
| | | | 210/260 |
| 4,710,295 A | 12/1987 | Zabel | |

(Continued)

FOREIGN PATENT DOCUMENTS

| | | |
|---|---|---|
| CN | 108744694 | 11/2018 |
| CN | 110339607 A | 10/2019 |

(Continued)

OTHER PUBLICATIONS

Korkut, et al., Wastewater Treatment With Biomass Attached To Porous Geotextile Baffles, Journal of Environmental Engineering Feb. 2006.

(Continued)

*Primary Examiner* — Madeline Gonzalez
(74) *Attorney, Agent, or Firm* — Heslin Rothenberg Farley & Mesiti P.C.

(57) ABSTRACT

A septic tank filter system includes a tank. The tank includes an inlet and an outlet, wherein the outlet is disposed on the tank below the inlet to enable a flow of wastewater to be gravity fed from the inlet to the outlet. A filter is positioned in the tank. The filter includes a frame. A filter media is disposed on the frame. The filter media is operable to filter the wastewater of waste material as the wastewater passes therethrough. A top opening is disposed on a top portion of the frame. A bottom of the top opening is located above the tank outlet and below the tank inlet. When the filter media is not clogged, a level of the wastewater remains below the top opening. When the filter media is clogged, the level of the wastewater rises until the wastewater flows over the top opening.

20 Claims, 13 Drawing Sheets

(51) Int. Cl.
*B01D 29/58* (2006.01)
*B01D 35/30* (2006.01)

(56) References Cited

U.S. PATENT DOCUMENTS

| | | |
|---|---|---|
| 5,582,716 A | 12/1996 | Nurse, Jr. |
| 5,593,584 A | 1/1997 | Nurse, Jr. |
| 5,958,239 A | 9/1999 | Sing |
| 6,360,898 B1 | 3/2002 | Nurse, Jr. et al. |
| 7,740,756 B2 | 6/2010 | Hornback et al. |
| 2003/0010690 A1 | 1/2003 | Okajima et al. |
| 2007/0163959 A1 | 7/2007 | Cote et al. |

FOREIGN PATENT DOCUMENTS

| | | |
|---|---|---|
| CN | 210012719 U | 2/2020 |
| EP | 1637205 | 3/2006 |
| WO | 2003024561 | 3/2003 |

OTHER PUBLICATIONS

International Search Report and Written Opinion for PCT/US2022/082220 completed Apr. 10, 2023, 51 pgs.

\* cited by examiner

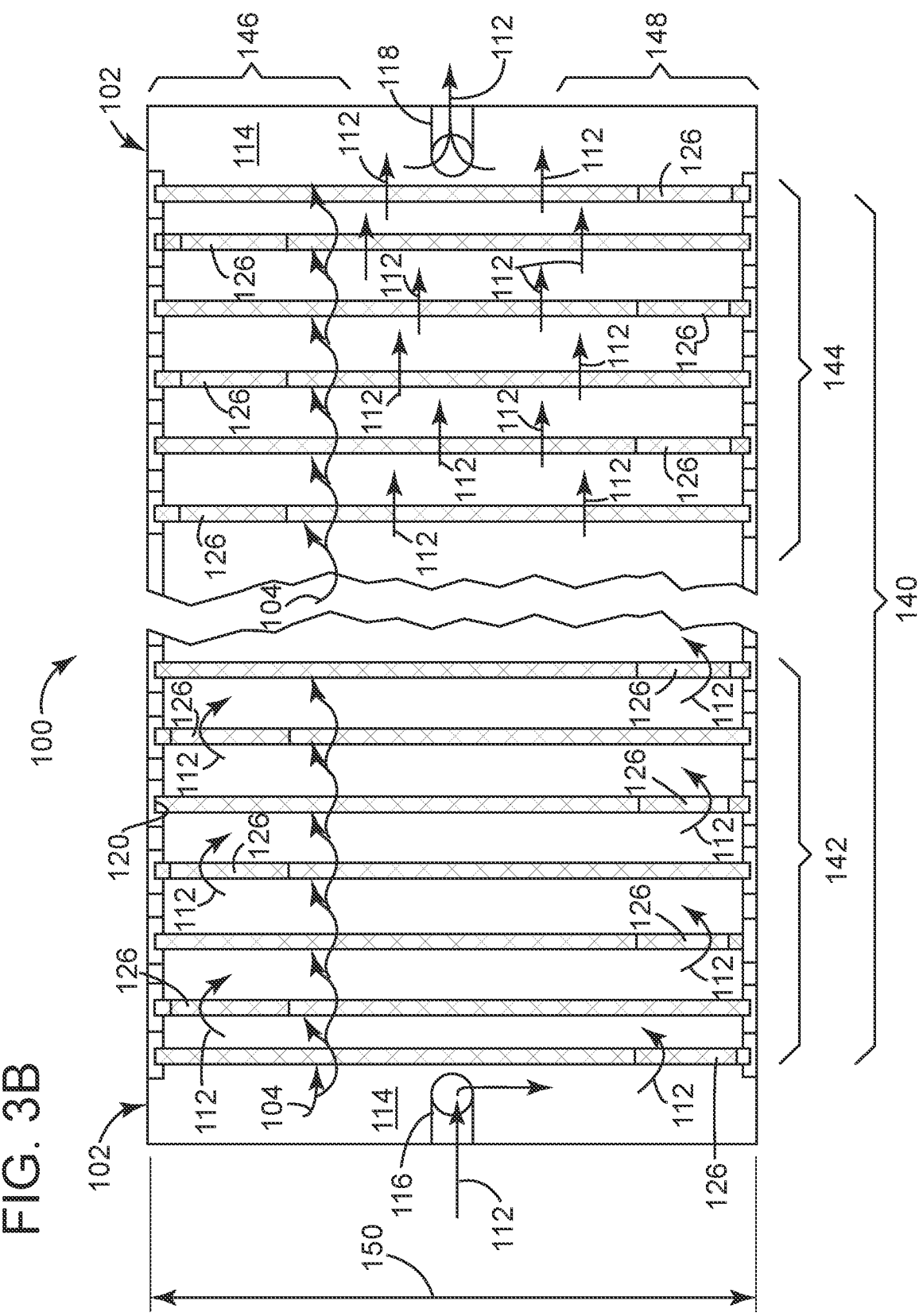

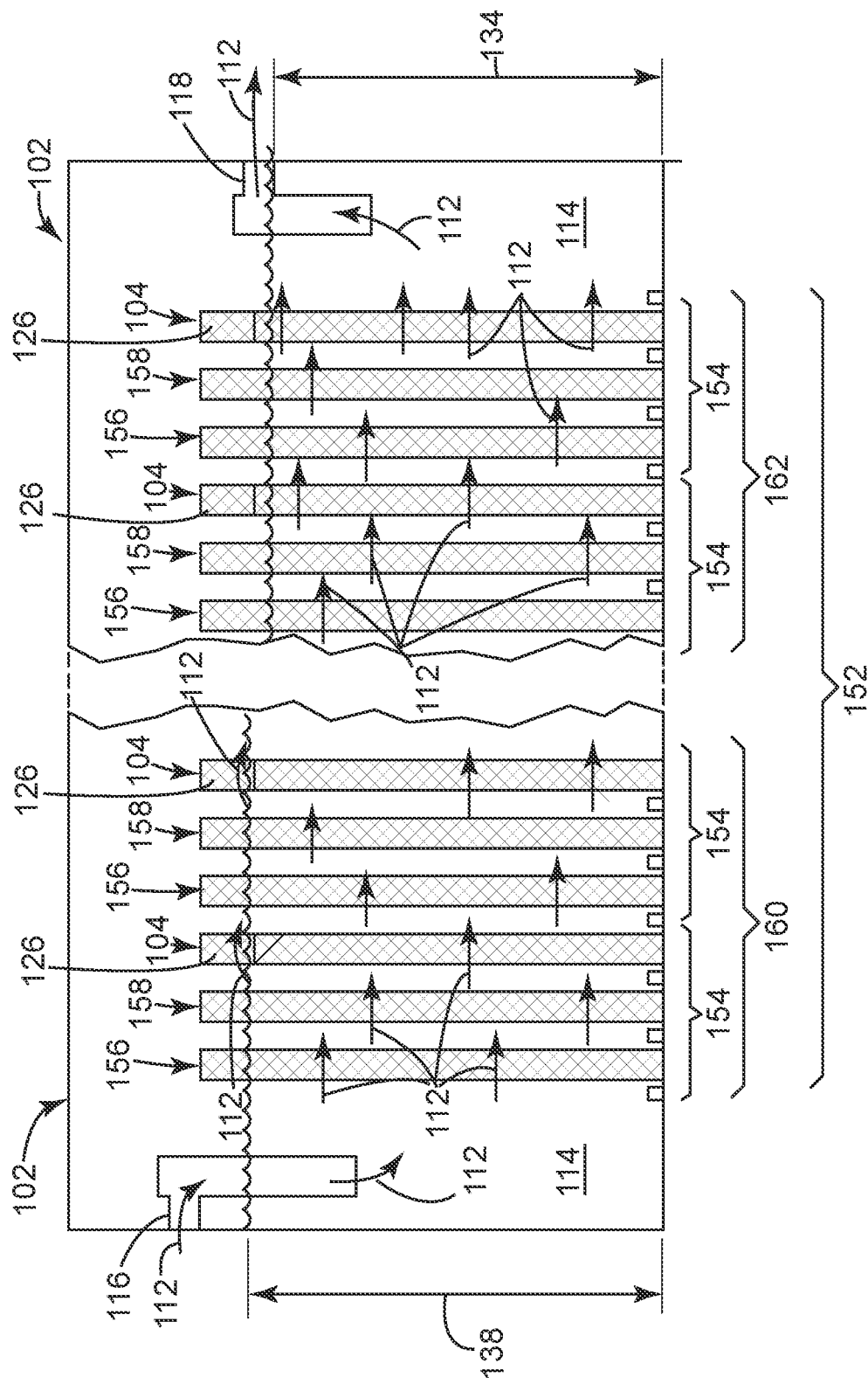

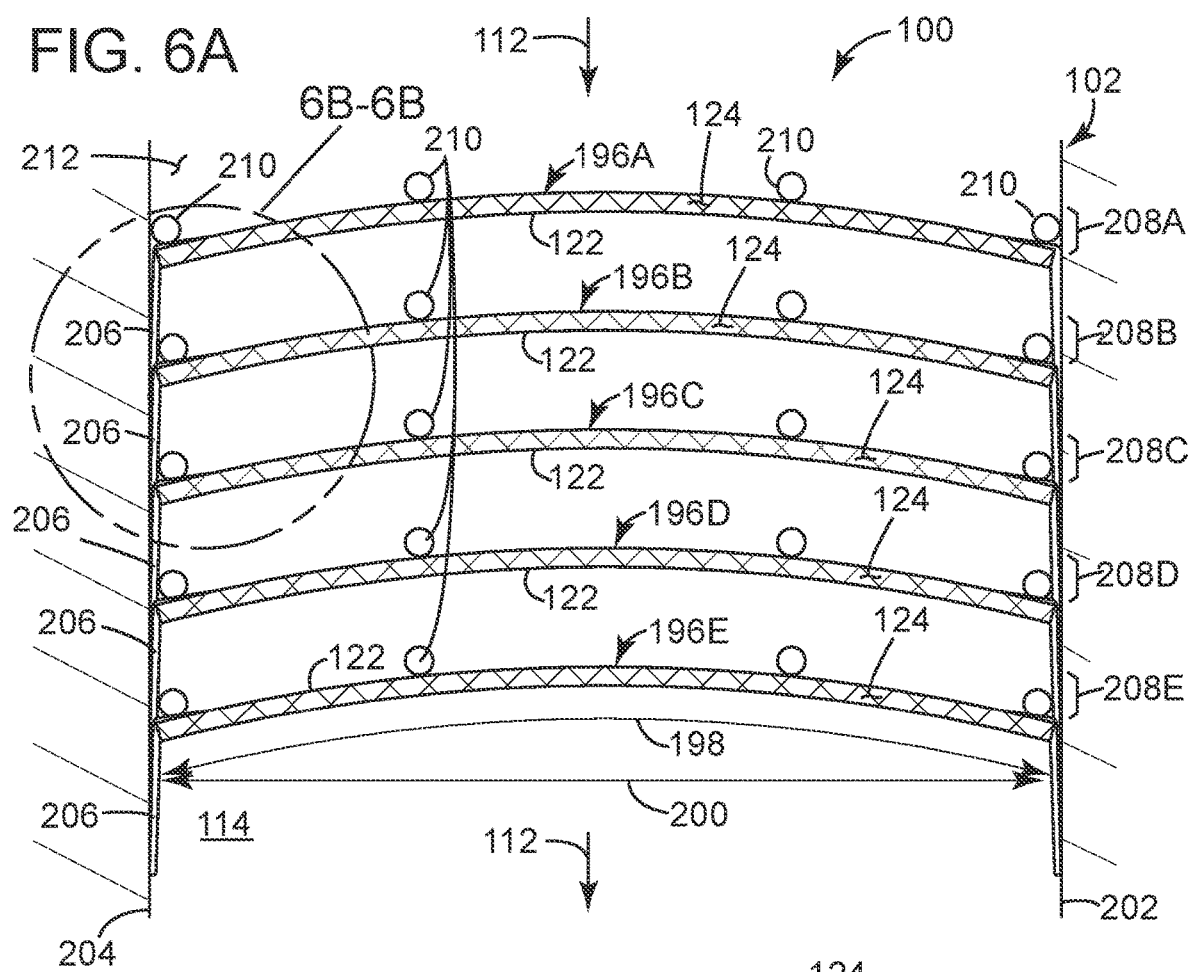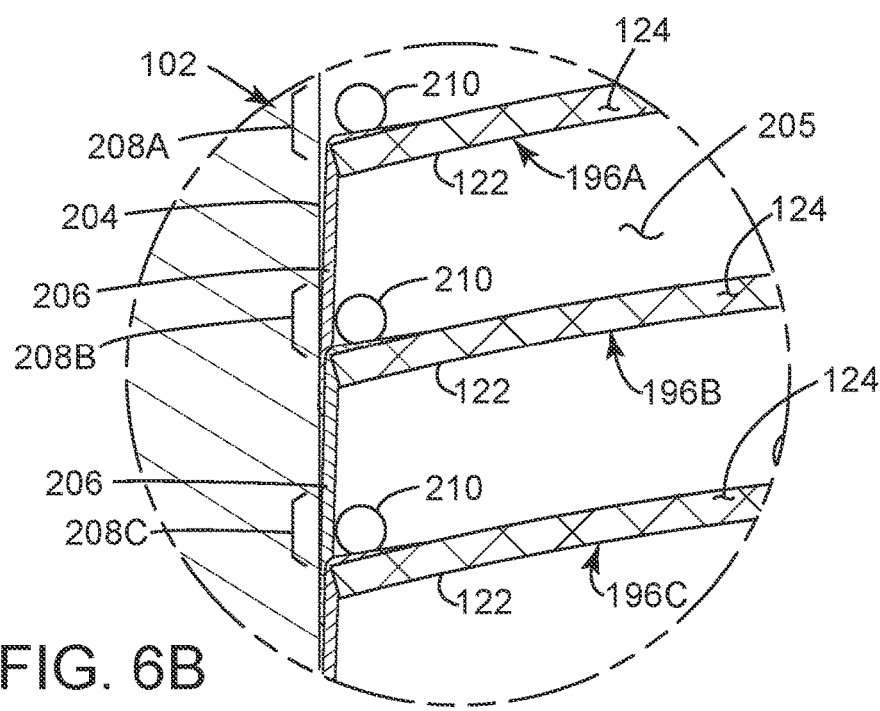

SEPTIC TANK FILTER SYSTEM

TECHNICAL FIELD

The present disclosure relates to septic tank filtering systems. More specifically, the disclosure relates to septic tank filtering systems, which promote the growth of anaerobic microbes to digest waste material from a flow of wastewater.

BACKGROUND

Septic systems (or on-site wastewater treatment systems) typically include a primary septic tank that is designed to separate out waste materials from a flow of wastewater prior to distributing the wastewater in a soil absorption system (herein "SAS") of an owner's property. Soil absorptions systems may also be referred to as a soil absorption field, soil sewage absorption system, sewage absorption system, septic drain field or leach field. They typically include an arrangement of trenches containing perforated pipes and porous material covered by a layer of soil.

The waste material may include heavy solids, which settle to the bottom of the primary septic tank. Additionally, the waste material may include scum, oil or grease, which float to the top of the wastewater flow. Due to baffling in the primary septic tank, the wastewater in the middle flows out the outlet of the primary septic tank for the purpose of seeping into the subsurface soil (i.e., SAS) evenly over a relatively large area.

However, often an owner's property may be too small to accommodate a properly sized SAS or the existing soil may not be conducive to absorbing or leaching water well. For example, the soil of an owner's property may have a high clay content, which does not absorb water well. Also by way of example, the upper layer of soil may not be vertically thick enough to fully remove the contaminants as desired, potentially allowing insufficiently treated wastewater to enter the groundwater system.

When an SAS cannot be properly sized to handle a given wastewater flow from a septic system, a secondary septic tank filtering system (or enhanced treatment unit (ETU)) may be installed to further process the wastewater from the primary septic tank.

Prior art secondary septic tank filtering systems are often aerobic septic tank filtering systems, which rely on aerobic microbes to digest additional waste material from the wastewater that exits the primary septic tank. More specifically, much of the waste materials of a wastewater flow exiting a primary septic tank are nutrients. The aerobic microbes in a secondary septic tank filtering system (or ETU) digest the nutrients and expel cleaner water, which can then be distributed over a smaller SAS or an SAS with soil that is not readily conducive to absorbing water. Further, with reduced loading, due to the additional treatment, the SAS is very likely to last much longer.

Problematically though, prior art aerobic septic tank filtering systems require air pumps, air blowers or other forced air systems to be installed above ground that must constantly pump air into the below ground filtering system to promote the growth of the aerobic microbes. Such pumps are costly, make noise and require constant and frequent maintenance. Additionally, such aerobic septic tank filtering systems must be cleaned fairly frequently.

Accordingly, there is a need for a septic tank filtering system that does not require external air pumps. Additionally, there is need for a septic tank filtering system that is less costly and requires less maintenance than prior art aerobic septic tank filtering systems.

BRIEF DESCRIPTION

The present disclosure offers advantages and alternatives over the prior art by providing a septic tank filtering system that promotes the growth of anaerobic microbes, rather than aerobic microbes. The anaerobic septic tank filtering system is purely gravity fed, requires no electricity and is devoid of any forced air being pumped through the wastewater to promote the growth of aerobic microbes. Accordingly, the anaerobic septic tank filtering system is more cost effective and requires less maintenance than prior art anaerobic septic tank filtering systems.

A septic tank filter system in accordance with one or more aspects of the present disclosure includes a tank and a first filter positioned in the tank. The tank includes an inlet and an outlet, wherein the outlet is disposed on the tank below the inlet to enable a flow of wastewater to be gravity fed from the inlet to the outlet. The first filter includes a first frame, a first filter media and a top opening (or overflow weir). The first filter media is disposed on the first frame. The first filter media is operable to filter the wastewater of waste material as the wastewater passes therethrough. The top opening is disposed on a top portion of the first frame, wherein a bottom of the top opening (or invert of the weir) is located above the tank outlet and below the tank inlet. When the first filter media is not clogged, a level of the wastewater remains below the top opening. When the first filter media is clogged (or substantially clogged), the level of the wastewater rises until the wastewater flows over the top opening.

Another septic filter system in accordance with one or more aspects of the present disclosure includes a tank and a plurality of first filters positioned in the tank. The tank includes an inlet and an outlet, wherein the outlet is disposed on the tank below the inlet to enable a flow of wastewater to be gravity fed from the inlet to the outlet. The plurality of first filters is positioned in the tank such that the flow of wastewater flows through each first filter of the plurality of first filters. Each first filter of the plurality of first filters includes a first frame, a first filter media and a top opening (or weir). The first filter media is disposed on the first frame. The first filter media is operable to filter the wastewater of waste material as the wastewater passes therethrough. The top opening is disposed on a top portion of the first frame, wherein a bottom of the top opening (or invert of the weir) is located above the tank outlet and below the tank inlet. When the first filter media of a one of the first filters of the plurality of first filters is not clogged, a level of the wastewater remains below the top opening of the one of the first filters. When the first filter media of a one of the first filters of the plurality of first filters is clogged (or substantially clogged), the level of the wastewater rises until the wastewater flows over the top opening of the one of the first filters.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which:

FIG. 3B depicts an example of a top view of the septic tank filter system of FIG. 3A, according to aspects described herein;

FIG. 4A depicts an example of a side view of a septic tank filter system having a tank and a plurality of sets of second, third and first filters disposed therein, wherein an upstream portion of the filter sets are clogged and a remaining downstream portion of the filter set are unclogged, according to aspects described herein;

FIG. 6A depicts an example of a top view of a septic tank filter system having a tank and a plurality of bowed first filters disposed therein, according to aspects described herein;

FIG. 6B depicts an example of an enlarged view of the circular area 6B-6B in FIG. 6A, according to aspects described herein;

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example maybe combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1A:
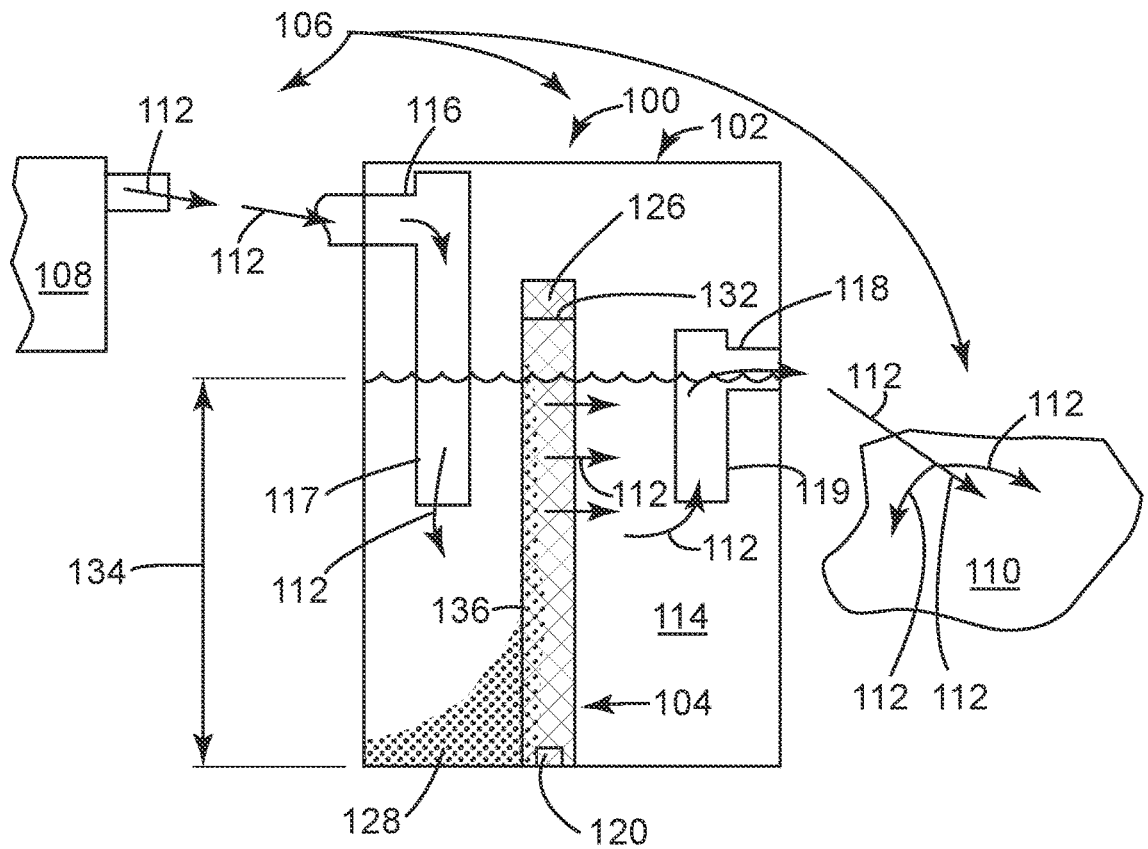
FIG. 1A depicts an example of a side view of septic tank filter system having a tank and a first filter disposed therein, wherein the first filter is unclogged, according to aspects described herein.
Figure 1B:
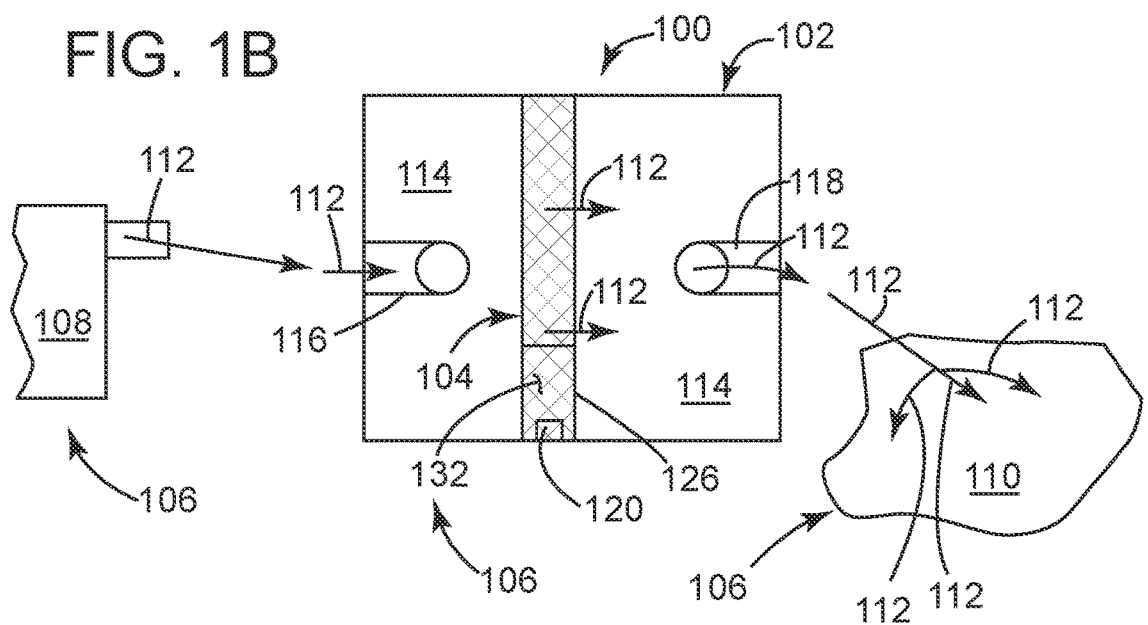
FIG. 1B depicts an example of a top view of the septic tank filter system of FIG. 1A, according to aspects described herein.

Referring to FIGS. 1A and 1B, an example is depicted of a side view (FIG. 1A) and a top view (FIG. 1B) of septic tank filter system 100, having a tank (or secondary processing tank) 102 and a first filter 104 disposed therein, wherein the first filter 104 is unclogged, according to aspects described herein. The septic tank filter system 100 in the example illustrated in FIGS. 1A and 1B, is part of a larger septic tank system 106 (or on-site wastewater treatment system 106) that further includes a primary septic tank 108 and a soil absorption system (SAS) 110, which is sometimes referred to as a leach field. The tank 102 of the septic tank filter system 100 is therefore illustrated as a secondary processing tank 102 that receives a flow (represented by arrows 112) of treated wastewater 114 from the primary septic tank 108 of the overall septic tank system 106. The wastewater 114 is then further processed through the secondary processing tank 102 of the septic tank filter system 100 and distributed evenly throughout the SAS 110.

However, it is within the scope of this invention that the form and function of the primary septic tank 108 of the septic system 106 and the secondary processing tank 102 of the septic tank filtering system 100 may be incorporated into one single tank. For example, a single tank may be configured into one or more compartments that collectively perform the primary processing of the primary septic tank 108 and the secondary processing of the tank 102 of the septic tank filter system 100.

The tank 102 of the septic tank filtering system 100 includes a tank inlet 116 and a tank outlet 118. The tank inlet 116 and tank outlet 118 are typically configured as a tee, wherein a lower leg of the tee extends below the surface and into the wastewater 112 and the other leg of the tee includes an open upper end to allow air to pass within the tank 102.

The tank outlet 118 is disposed on the tank 102 below the tank inlet 116 to enable the flow of wastewater 112 to be gravity fed from the inlet 116 to the outlet 118. For example, the tank inlet 116 and tank outlet 118 may both be four inch pipes, wherein the bottom of the tank inlet pipe 116 may be located on the tank 102 three inches above the bottom of the tank outlet pipe 118. Advantageously, because the outlet 118 is below the level of the inlet 116, the wastewater 114 will be gravity fed from inlet to outlet without the use of pumps or other forced flow devices. More specifically, the flow 112 of wastewater 114 will enter the inlet 116 and flow downward through a first baffle or tube 117, which directs the flow 112 below a level 134 of the wastewater 114. The wastewater flow will then flow through the first filter 104 and up a second baffle or tube 119 and out the outlet 118, all be the force of gravity alone.

Figure 1C:
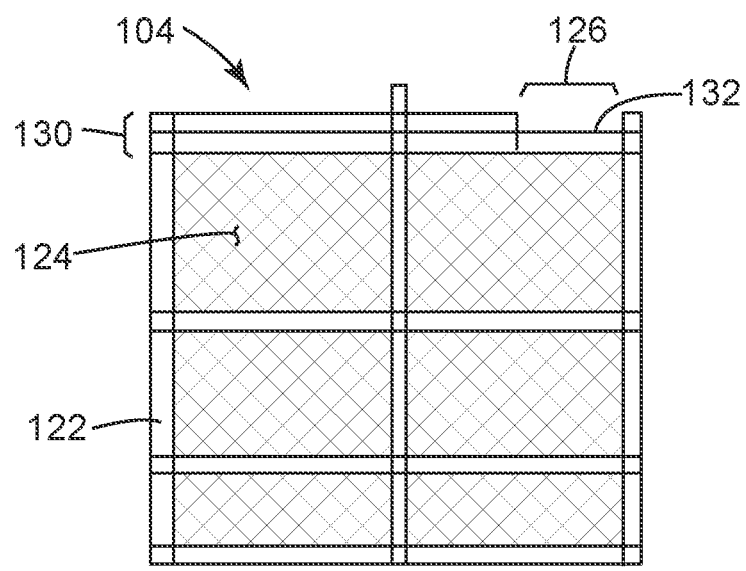
FIG. 1C depicts an example of a front view of the first filter of the septic tank filter system of FIG. 1A, according to aspects described herein.

Referring to FIG. 1C, an example is depicted of a front view of the first filter 104 of the septic tank filter system 100, according to aspects described herein. The first filter 104 may be positioned and secured in the tank by various devices. In the example illustrated in FIG. 1A, the first filter is positioned by slots or brackets 120.

The first filter 104 includes a first filter frame (or first frame) 122, a first filter media 124 and a top opening 126 (or overflow weir 126). The first filter media 124 disposed on the first frame 122. The first filter media 124 is operable to filter the wastewater 114 of waste material 128 as the wastewater flow 112 passes therethrough. When the first filter media 124 of the first filter 104 is unclogged, the flow 112 of wastewater 114 will pass readily through first filter media 124 (see FIG. 1A). When the first filter media 124 becomes clogged (or substantially clogged), the flow 112 of wastewater 114 will not be able to pass readily through and may be completely blocked from passing through the first filter media 124 (see FIG. 2A).

For purposes herein, the term "substantially clogged" refers to the state of the filter media 124 having a reduced permeability, such that wastewater 114 does not readily flow through the filter media 124. As such, with a substantially clogged first filter 104, the level of wastewater 114 may rise in the tank 102 even though some small amount of wastewater 114 still flows 112 through the filter media 124.

The first filter media 124 may be any number of filter materials compatible with the conditions presented in the application. For example, when the wastewater is sewage water, the filter media must remain undamaged when in contact with the solid wastes, scum, oil, grease and other waste materials 128 that commonly flow in sewage water. Additionally, the first filter media 124 must be compatible with the various microbes that grow on such waste materials. Examples of filter media materials include fabrics or screens of various plastics, such as polyester or acrylonitrile butadiene styrene (ABS) or polypropylene fabric or the like.

The first frame 122, as well as all other frames (e.g., the second frame 164 and third frame 174) of filters discussed herein, refers to a structure designed to support the filter media (e.g., first filter media 124, second filter media 166 and third filter media 176) disposed over the frame. So, for example, the frame may have a box-like structure, a lattice structure or other structure that is operable to support the filter media under the conditions of the application that the filter is subjected to.

The top opening 126 (or overflow weir) is disposed on a top portion 130 of the first frame 122. When the first filter 104 is positioned in the tank 102, a bottom 132 of the top opening 126 is located above the tank outlet 118 and below the tank inlet 116.

The waste material 128 that is filtered out of the wastewater 114 and the first filter media 124 promotes the growth of primarily anaerobic microbes 136 on the first filter media 124. This is because the septic filter system 100 is advantageously devoid of any forced air being pumped through the wastewater to promote the growth of aerobic microbes. However, the growth of the anaerobic microbes 136 causes the first filter 104 to clog with anaerobic microbes over a period of time such that the wastewater 114 no longer passes through the first filter media 124.

Figure 2A:
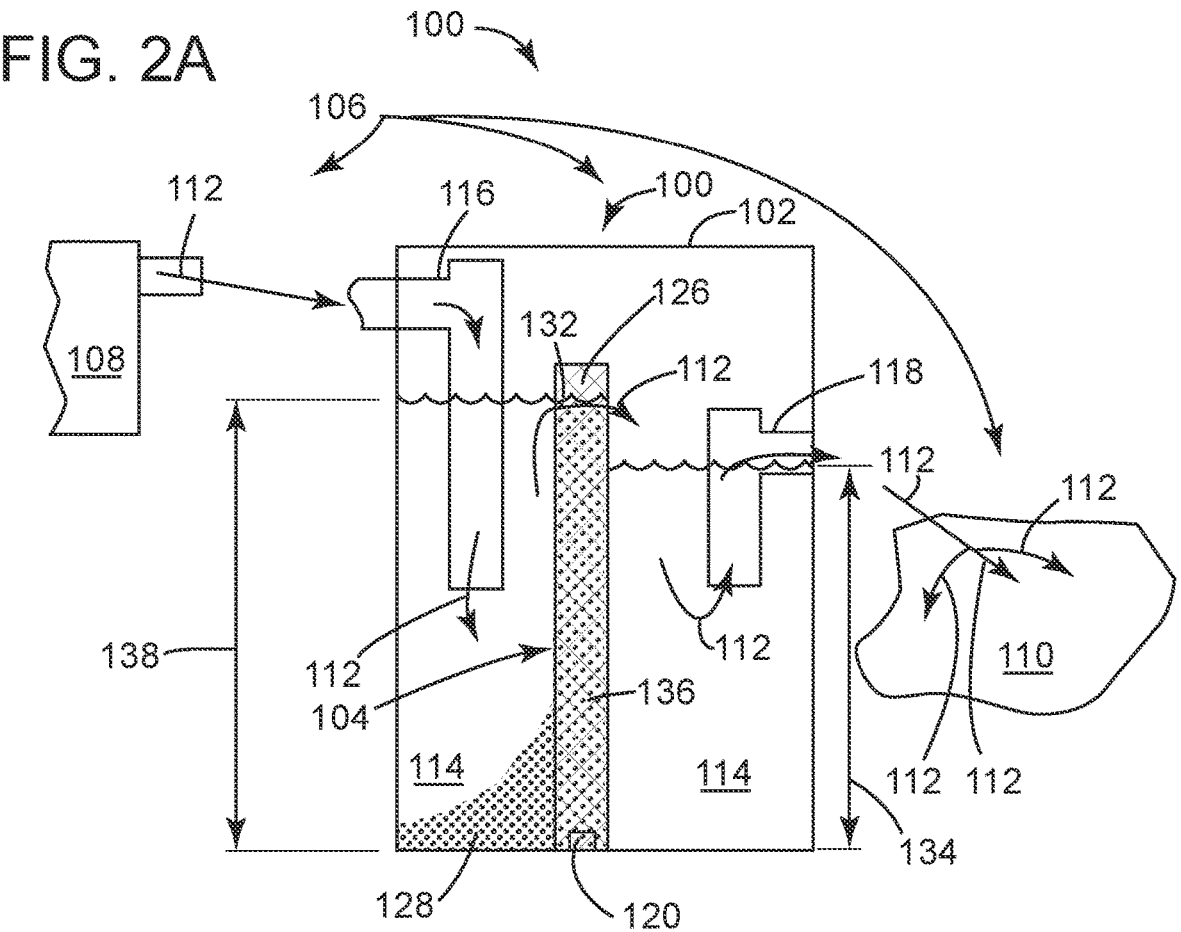
FIG. 2A depicts an example of a side view of the septic tank filter system of FIG. 1A, wherein the first filter is clogged, according to aspects described herein.
Figure 2B:
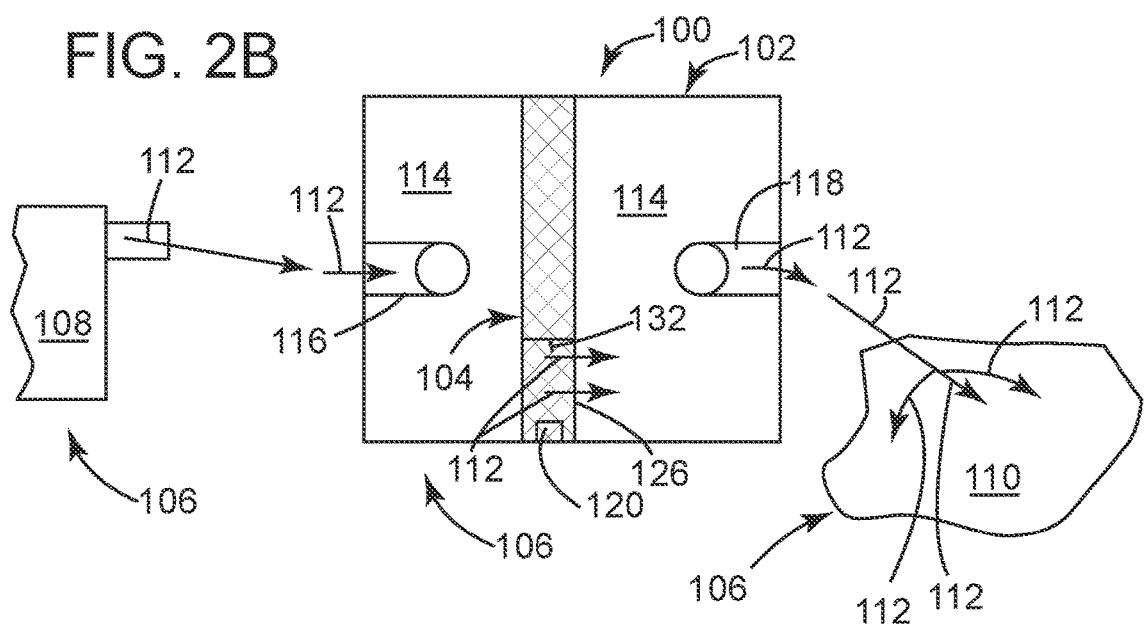
FIG. 2B depicts an example of a top view of the septic tank filter system of FIG. 2A, according to aspects described herein.

Referring to FIGS. 2A and 2B, an example is depicted of a side view (FIG. 2A) and a top view (FIG. 2B) of the septic tank filter system 100, wherein the first filter 104 is clogged with anaerobic microbes, according to aspects described herein. When the first filter media 124 is not clogged, a first level 134 of the wastewater remains below the bottom 132 of the top opening 126 (see FIG. 1A). Advantageously however, when the first filter media 124 is clogged with anaerobic microbes, the wastewater rises to a second level 138 wherein the wastewater 114 flows over the top opening 126 (see FIG. 2A).

More specifically, the water level 138 on the upstream side of the first filter 104 rises, because the flow 112 of wastewater 114 can no longer flow readily though the filter media 124 of the first filter 104 or, in other words, flow 112 exceeds the permeability of the first filter 104. The wastewater 112 on the downstream side of the filter 104 stays at the unclogged first level 134 because the outlet 118 prevents the water level 134 from rising above the height of the outlet 118. However, once the water level 138 on the upstream side of the first filter 104 reaches the bottom 132 (or invert 132) of the top opening 126, the flow 112 of wastewater 114 flows over the top opening 126 and the water level 134 is fixed on the downstream side of the filter 104. Accordingly, the location of the bottom 132 of the top opening 126 being located above the outlet 118 of the tank 102 and below the inlet 116 of the tank 102 advantageously prevents the wastewater from reaching the height of the tank inlet 116 and backing up into the primary septic tank 108.

Additionally, and advantageously, the significant quantity of anaerobic microbes 136 in the clogged first filter media 124 digest the waste material 128 in the wastewater 114 that flows by the filter media 124 and expel cleaner water back into the wastewater 114 in a secondary cleaning process. The cleaner wastewater 114 then flows 112 over the top opening 126 and makes its way to the outlet 118 of the tank 102 where it gets distributed throughout the SAS 110. In doing so, the cleaner wastewater 114 has less of a detrimental affect on the SAS 110 and, therefore, the life of the SAS is substantially increased.

Figure 3A:
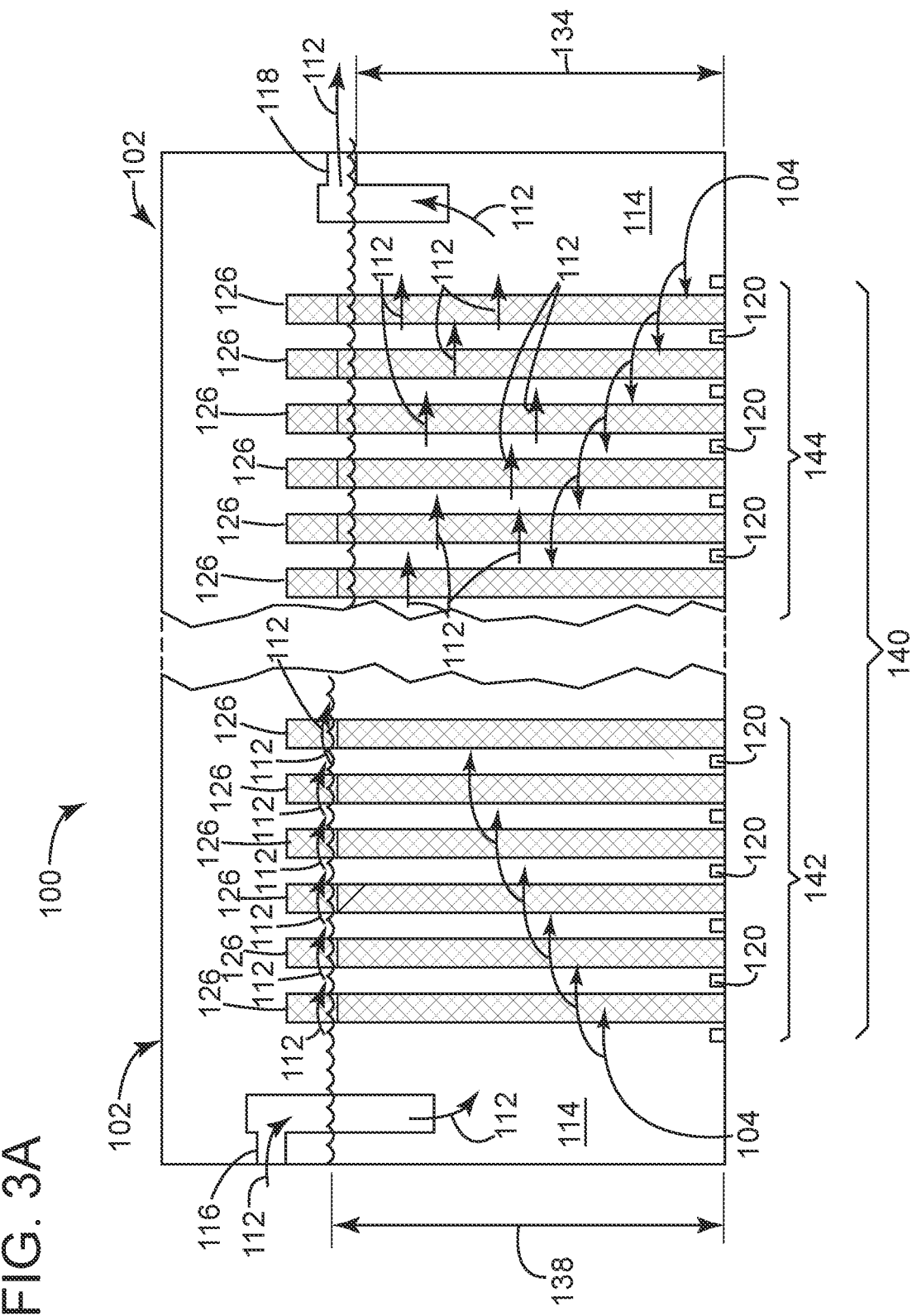
FIG. 3A depicts an example of a side view of a septic tank filter system having a tank and a plurality of first filters disposed therein, wherein an upstream portion of the first filters are clogged and a remaining downstream portion of the first filters are unclogged, according to aspects described herein.

Referring to FIGS. 3A and 3B, an example is depicted of a side view (FIG. 3A) and a top view (FIG. 3B) of another embodiment of a septic tank filter system 100 having a tank 102 and a plurality 140 of first filters 104 disposed therein, according to aspects described herein. In the example illustrated in FIGS. 3A and 3B, an upstream portion 142 of the plurality 140 of first filters 104 is clogged or substantially clogged and a remaining downstream portion 144 of the plurality 140 of first filters 104 is unclogged.

The plurality 140 of first filters 104 is positioned in the tank 102 such that the flow 112 of wastewater 114 flows sequentially through each filter 104 of the plurality 140 of first filters 104 in a direction of flow 112 from the tank inlet 116 to the tank outlet 118. In the example illustrated in FIGS. 3A and 3B, the direction of flow 112 is generally in the longitudinal direction along the length of the tank 102. Over time, the filters 104 of the plurality 140 of first filters 104 will clog sequentially in the direction of the flow 112 of the wastewater 114.

Moreover, the top openings 126 of each adjacent filter 104 of the plurality 140 of first filters 104 are located on opposing sides (i.e., first side 146 and second side 148) of the tank 102. Accordingly, as the filters 104 are clogged sequentially, the wastewater 114 will laterally flow 112 back and forth across a portion of a width 150 of the tank 102 and over each adjacent top opening 126 of the clogged filters 142. The back and forth lateral direction of flow 112 further helps to promote the growth of anaerobic microbes 136 and, therefore, further cleans the wastewater 114.

Because the microbes are anaerobic, no forces air moving system, such as a pump, is required to constantly introduce air into the system. As such, the noise, cost and maintenance issues required of an externa pump are largely eliminated with this system 100.

Eventually, all of the filters 126 of the plurality 140 of filters 126 will clog. Whereupon, the anaerobic microbes 136 will further clean the wastewater 114 until the microbes eventually begin to fill the tank 102. When this occurs, the tank 102 will have to be cleaned and/or the filters 126 will have to be replaced. However, a properly sized tank 102 may not have to be cleaned for up to ten years or more.

The plurality of first filters 104 illustrated in FIGS. 3A and 3B, as well as the other filter systems illustrated herein, provide an extensive surface area of filter media 124 for anaerobic microbes 136 to grow upon, multiply, die and grow again. The design, for example as in FIGS. 3A and 3B, enables wastewater 114 to travel through the filter media 124 fabric material to form and feed anaerobic microbes 136 on the filters, such as filter 104. The filters 104 are arranged to keep the velocity of the wastewater flow 112 through the tank 102 to a minimum. This enhances additional settling of the waste material 128. When the anaerobic microbes 136 grow to a heavy mass, it is likely for the mass to "slough" off the media 124 (i.e., slide off the media 124 as a mass settling to the bottom of the tank 102). After some of the microbes 136 slough off, more room is made for additional microbes 136 to grow and metabolize the waste 128 dissolved in the wastewater, thus further cleaning the wastewater 114.

Accordingly, the majority of filtering and cleaning of the wastewater 114 in this septic tank filter system 100 is performed by biological growth of anaerobic microbes 136. The filter media 124 of the filters 104 supports this biological growth. The filter media 124 allows the anaerobic microbes 136 to grow and perform the majority of the filtering of waste material 128.

Figure 4B:
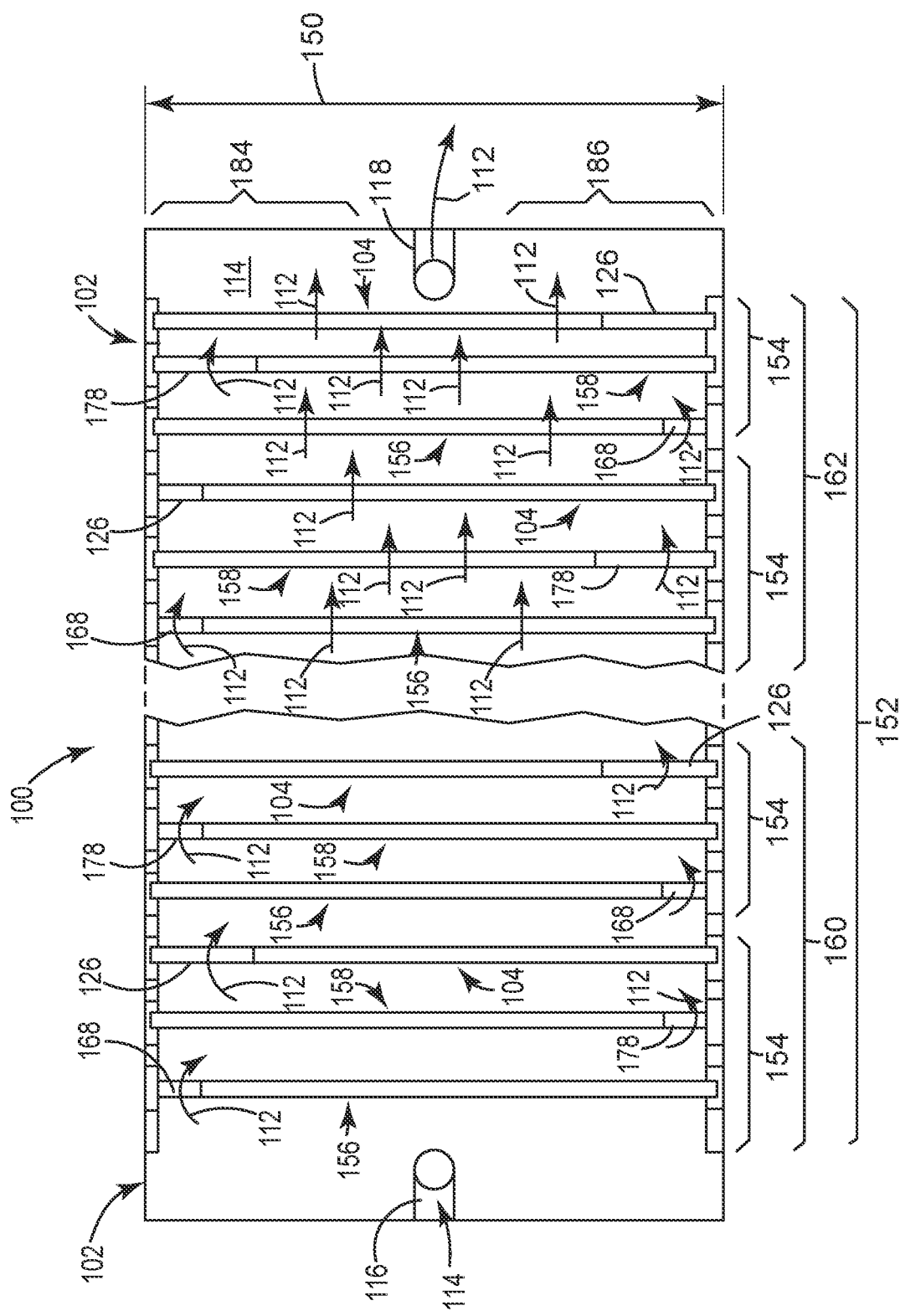
FIG. 4B depicts an example of a top view of the septic tank filter system of FIG. 4A, according to aspects described herein.

Referring to FIGS. 4A and 4B, an example is depicted of a side view (FIG. 4A) and a top view (FIG. 4B) of another embodiment of a septic tank filter system 100 having a tank 102 and a plurality 152 of sets 154 of second 156, third 158 and first 104 filters disposed therein, according to aspects described herein. In the example illustrated in FIGS. 4A and 4B, an upstream portion 160 of the filter sets 154 is clogged or substantially clogged and a remaining downstream portion 162 of the filter sets 154 is unclogged.

Each set 154 of filters, in the plurality 152 of sets 154 of filters, include a second filter 156, a third filter 158 and the first filter 104. The plurality 152 of sets 154 of filters 156, 158, 104 are positioned in the tank such that the flow 112 of wastewater 114 flows sequentially though each set 154 in a direction of flow from the tank inlet 116 to the tank outlet 118. The second 156, third 158 and first 104 filters of each set 154 of filters are positioned in the tank 102 such that the wastewater flows 112 sequentially from the second filter 156 to the third filter 158 and then to the first filter 104.

Figure 4C:
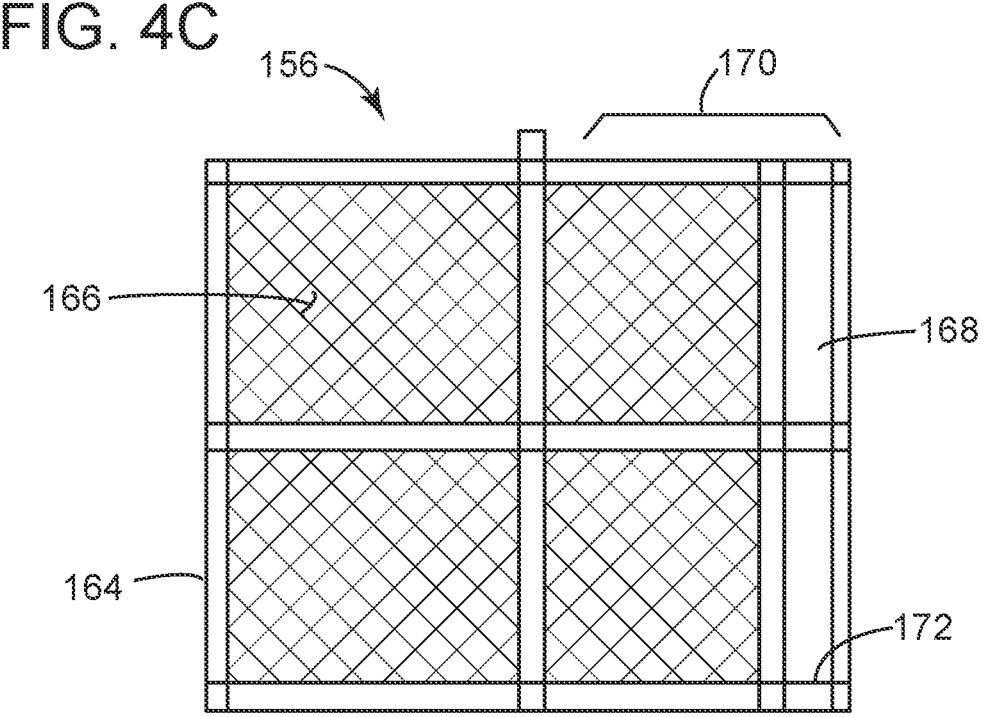
FIG. 4C depicts an example of a front view of the second filter of the septic tank filter system of FIG. 4A, according to aspects described herein.

Referring to FIG. 4C, an example is depicted of a front view of the second filter 156 of the septic tank filter system 100, according to aspects described herein. The second filter 156 includes a second frame 164, a second filter media 166 and a second filter side opening 168.

The second filter media 166 is disposed on the second frame 164. The second filter media 166 is operable to filter the wastewater 114 of waste material 128 as the wastewater 114 passes therethrough. The second filter media 166 may be composed of the same or different material as that of the first filter media 124. For example, the second filter media 166 may be composed of filter fabric made of polyester or screens of various plastics, such as acrylonitrile butadiene styrene (ABS) or polypropylene fabric or the like. The frames may be constructed with ABS, PVC or any other plastic or stainless steel.

The second filter side opening 168 is disposed on a side 170 of the second frame 164, wherein a bottom 172 of the second filter side opening 168 is located below the tank outlet 118. By locating the bottom 172 of the second side opening 168 below the tank outlet 118, the flow 112 of wastewater 114 will always flow freely around the second filter 156 and through the second side opening 168 regardless of whether the second filter media 166 is clogged or not. Accordingly, the flow 112 of wastewater 114 will flow readily through both the second filter media 166 and second side opening 168 when the second filter media is unclogged (see FIGS. 4A and 4B) and the wastewater flow 112 will flow readily around only the second side opening 168 and not through the second filter media 166 when the second filter media is clogged (see FIGS. 4A and 4B).

Figure 4D:
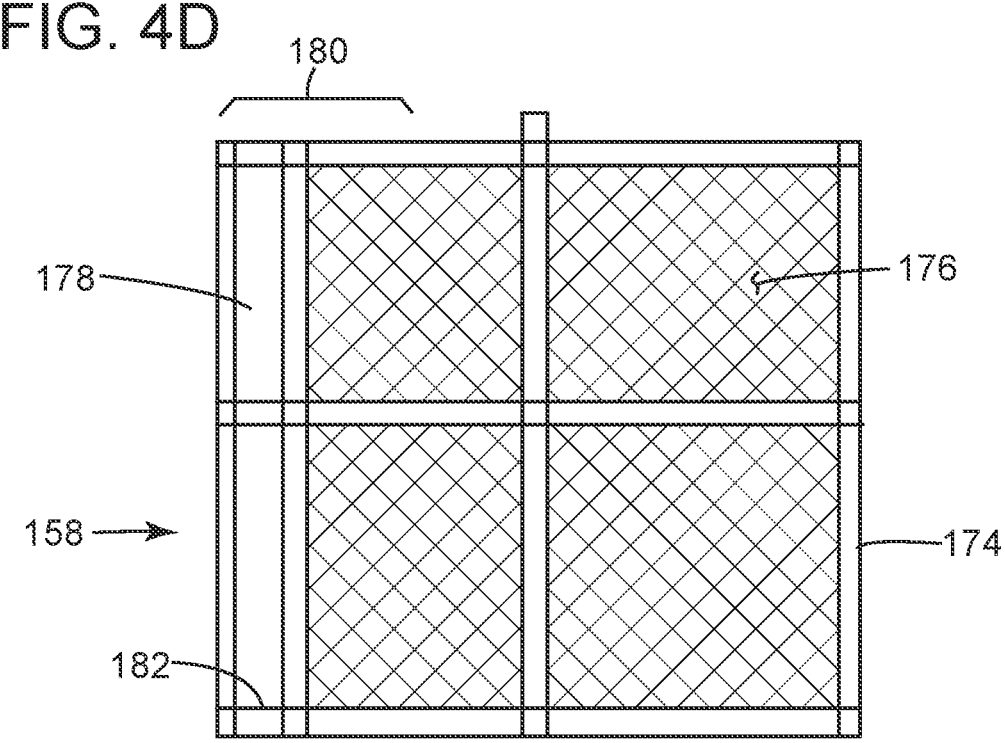
FIG. 4D depicts an example of a front view of the third filter of the septic tank filter system of FIG. 4A, according to aspects described herein.

Referring to FIG. 4D, an example is depicted of a front view of the third filter 158 of the septic tank filter system 100, according to aspects described herein. The third filter 158 includes a third frame 174, a third filter media 176 and a third filter side opening 178.

The third filter media 176 is disposed on the third frame 174. The third filter media 176 is operable to filter the wastewater 114 of waste material 128 as the wastewater 114 passes therethrough. The third filter media 176 may be composed of the same or different material as that of the first filter media 124. For example, the third filter media 176 may be composed of filter fabric made of polyester or screens of various plastics, such as acrylonitrile butadiene styrene (ABS) or polypropylene fabric or the like. The frames may be constructed with ABS, PVC or any other plastic or stainless steel.

The third filter side opening 178 is disposed on a side 180 of the third frame 174, wherein a bottom 182 of the third filter side opening 178 is located below the tank outlet 118. By locating the bottom 182 of the third side opening 178 below the tank outlet 118, the flow 112 of wastewater 114 will always flow freely around the third filter 158 and through the third side opening 178 regardless of whether the third filter media 176 is clogged or not. Accordingly, the flow 112 of wastewater 114 will flow readily through both the third filter media 176 and third side opening 178 when the third filter media is unclogged (see FIGS. 4A and 4B) and the wastewater flow 112 will flow readily around only the third side opening 178 and not through the third filter media 176 when the third filter media is clogged (see FIGS. 4A and 4B).

Referring again to FIGS. 4A and 4B, when the second and third filters 156, 158 of each set 154 of second, third and first filters 156, 158, 104 of the plurality 152 of sets 154 of filters are positioned in the tank 102, the second and third filter side openings 168, 178 are disposed on opposing first and second sides 184, 186 of the tank 102. Accordingly, the wastewater 114 will laterally flow 112 back and forth from second filter side opening 168 to third filter side opening 178, whether the filters 156, 158 are clogged or not.

Therefore, as illustrated in FIGS. 4A and 4B, in the clogged upstream portion 160 of the plurality 152 of sets 154 of filters, the flow 112 of wastewater 114 flows laterally across a width 150 of the tank 102 and sequentially through the side opening 168 of the second filter 156, the side opening 178 of the third filter 158 and the top opening 126 of the first filter 104. The flow 112 of wastewater 114 does not flow readily through any of the filter media 166, 176, 124 of the first, second and third filters 156, 158, 104 in the clogged upstream portion 160, because the filter media are all clogged or substantially clogged.

By contrast, in the unclogged downstream portion 162 of the plurality 152 of sets 154 of filters, the flow 112 of wastewater 114 flows sequentially and longitudinally through the second, third and first filter media 166, 176, 124 of the second, third and first filters 156, 158, 104, because the filter media are not clogged in the unclogged downstream portion 162. Additionally, the flow 112 of wastewater 114 in the unclogged downstream portion 162 also flows laterally across the width 150 of the tank 102 and sequentially through the side opening 168 of the second filter 156 and the side opening 178 of the third filter 158. The wastewater 112 will not flow 112 over the top opening 126 of the first filter 104 in the unclogged downstream portion 162, because the level 134 of wastewater 114 is below the bottom 132 of the top opening 126.

Advantageously, the back and forth lateral flow 112 across the width 150 of the tank 102 promotes the growth of anaerobic microbes, which digest the waste material 128 and further clean the wastewater 114. This back and forth lateral flow 112 will continue even when all the filters in the plurality 152 of sets 154 of filters has been clogged. However, even when all filters have been clogged, the level 138 of wastewater will remain below the tank inlet 116 because the bottom 132 of the top opening 126 is below the tank inlet 116.

Figure 5:
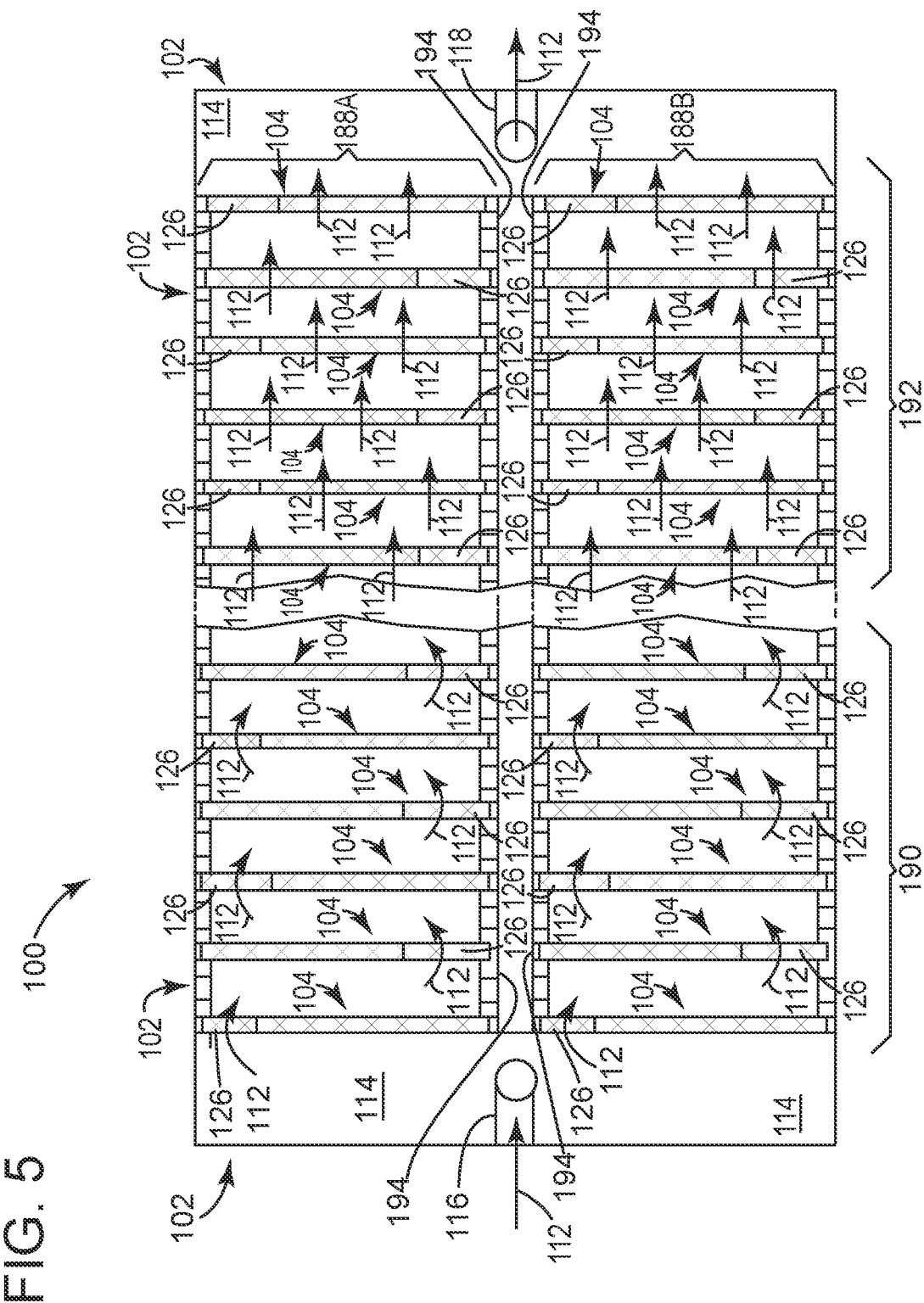
FIG. 5 depicts an example of a top view of a septic tank filter system having a tank and a plurality of rows of a plurality of first filters, wherein an upstream portion of each row is clogged and a remaining downstream portion of each row is unclogged, according to aspects described herein.

Referring to FIG. 5, an example is depicted of a top view of another embodiment of septic tank filter system 100 having a tank 102 and a plurality of rows 188A, 188B of a plurality of first filters 104, according to aspects described herein. An upstream portion 190 of each row 188A, 188B is clogged and a remaining downstream portion 192 of each row 188A, 188B is unclogged.

The plurality of rows 188A, 188B of first filters 104 are positioned substantially parallel to each other in the tank 102. Each row 188A, 188B includes a plurality of first filters 104. Each row 188A, 188B receives a portion of the flow of wastewater 114 from the tank inlet 116 and directs the same portion of the flow of wastewater 114 to the tank outlet 118. Each adjacent row 188A, 188B is separated by one or more inner tank walls 194 such that any wastewater 114 in one row 188A is not in fluid communication with wastewater 114 in another row 188B. The filters 104 of the plurality of first filters 104 in each row 188A, 188B will clog sequentially in the longitudinal direction of flow 112.

Though the example illustrated in FIG. 5 shows a pair of parallel rows 188A, 188B, it is within the scope of this disclosure that any number of parallel rows may be disposed in the tank 102. Additionally, though the example illustrated in FIG. 5 shows a plurality of solely first filters 104 in each row 188A, 188B, it is within the scope of this disclosure that second and/or third filters 156, 158 may also be disposed within each row 188A, 188B of filters along with the plurality of first filters 104.

Referring to FIGS. 6A and 6B, an example is depicted of a top view (FIG. 6A), and an enlarged view of circular area 6B-6B of FIG. 6A (FIG. 6B), of another embodiment of the septic tank filter system 100 having a tank 102 and a plurality of bowed first filters 196A, 196B, 196C, 196D, 196E (generally individually 196 and collectively 196A-E) disposed therein, according to aspects described herein. The bowed first filters 196A-E are a subset of the first filters 104 and have the same form and function as the first filters 104 as illustrated in FIG. 1C. Accordingly, like features on the first filter 104 of FIG. 1C and the bowed first filters 196A-E of FIGS. 6A and 6B will be referred to herein with the same reference numbers. An important difference between the bowed first filters 196A-E and first filter 104 is that the first frame 122 of bowed first filters 196A-E must be made of a resilient material, whereas the first frame 122 of first filter 104 is not necessarily made of a resilient material and may be made of a rigid material. Another important difference between the bowed first filters 196A-E and the first filters 104 is that the first filter media 124 of the bowed first filters 196A-E includes an extended portion 206 (best seen in FIG. 6B) that extends beyond the ends of the bowed first filter frames 122. For example, the extended portion 206 may wrap around the side ends of the bowed filter frames 122 and extend along the sidewalls 202, 204 of the tank 102 in a downstream direction of the flow 112 of wastewater 114. Also by example, the extended portion 206 may extend from the side ends of the bowed first filter frames 122 and extend along the walls in an upstream direction of the flow 112 of wastewater 114. Additionally and/or alternatively, the extended portion 206 may extend from the bottom end of the bowed filter frames 122 and extend along the floor 205 of the tank 102 in either the upstream or downstream directions of the flow 112 of wastewater 114.

The first filter frame 122 of each bowed first filter 196 is constructed of a resilient material, such as a resilient plastic. The first frame 122 of each bowed first filter 196 has a width 198 that is greater than a distance (or width) 200 between opposing sidewalls 202, 204 of the tank 102. The first frame 122 is operable to be bowed upon insertion into the tank 102 to frictionally fit between the opposing sidewalls 202, 204 of the tank 102 to form the bowed first filters 196A-E.

The plurality of bowed first filters 196A-E are positioned in the tank 102 such that the flow 112 of wastewater 114 flows sequentially through each filter 196 of the plurality of bowed first filters 196A-E in a longitudinal direction from the tank inlet 116 to the tank outlet 118. An extended portion 206 of the first filter media 124 of the bowed first filters 196A-E extends beyond the first frame 122 of each bowed first filter 196. The extended portion 206 may overlap, wrap around or extend from sides of the first frame 122 of each bowed first filter 196 and extend along the opposing sidewalls 202, 204 of the tank 102 (in either the upstream or downstream directions of waste waterflow 112), forming a substantially water-tight (or water-resistant) seal between the frame 122, the extended portion 206 and the sidewalls 202 and 204. Additionally or alternatively, the extended portion 206 may overlap, wrap around or extend from a bottom of the first frame 122 of each bowed first filter 196 and extend along the floor (bottom) 205 of the tank 102 (in either the upstream or downstream directions of waste water flow 112), forming a substantially water-tight (or water-resistant) seal between the frame 122, the extended portion 206 and the floor 205 of the tank 102.

The first frame 122 of each bowed first filter 196 abuts against the extended portion 206 of its associated first filter media 124 and/or abuts against the extended portion 206 of an adjacent first filter 196. The first frame 122 of each bowed first filter 196 may abut against the extended portion at the sidewalls 202, 204 of the tank 102 or at the bottom 205 of the tank 102.

As such, when the first frame 122 of each bowed first filter 119 abuts against an extended portion 206 of the first filter media 124, a substantially water-tight seal is formed therebetween. This water-tight seal may be formed at the sidewalls 202, 204 or at the floor 205 of the tank. In other words, a substantially water-tight seal is formed between the sidewalls 204, 202 of the tank 102, the bowed first filter frame 122 and the one or more layers of extended portion 206 that are sandwiched in between the frame 122 and wall 202, 204. Additionally, a substantially water-tight seal is formed between the floor 205 of the tank 102, the bowed first filter frame 122 and the one or more layers of extended portion 206 that are sandwiched in between the frame 122 and floor 205. Advantageously, the water-tight seal becomes enhanced as the growth of anaerobic microbes increases on, in and around the extended portions 206. The watertight seal advantageously prevents wastewater from flowing around the side edges or under the bottom edge of any bowed first filter 196.

By way of a non-limiting example, as illustrated in FIG. 6B, the frame 122 of the bowed first filter 196A forms a water-tight seal with just its single extended portion 206 of its filter media 124 disposed between the end of the frame 122 of bowed first filter 196A and the sidewall 204. Also, by example, the frame 122 of the bowed first filter 196B forms a water-tight seal with both layers of the extended portion 206 of bowed first filter 196A and the extended portion of bowed filter 196B disposed between the end of the frame 122 of the bowed first filter 196B and the sidewall 204.

A plurality of rows 208A, 208B, 208C, 208D, 208E (generally individually 208 and collectively 208A-E) of supports 210 are disposed on a floor 212 of the tank 102. The supports 210 extend upwards from the floor 212 of the tank 102. The supports 210 may be positioned on the upstream or downstream side of the bowed first filters 196A-E relative to the flow 112 of wastewater 114. Each row 208 of the plurality of rows 208A-E of supports 210 form an arcuate path across a width 200 of the tank 102. Each filter 196 of the plurality of bowed filters 196A-E conforms to a row 208 of supports 210 of the plurality of rows 208A-E of supports 210. The supports 210 are designed to enable the resilient first frames 122 of the first filters 196A-E to conform to the arced path, to provide support for the bowed first filters 196A-E and to enable ease of installation for the bowed first filters 196A-E. The supports 210 may also be spaced to allow wastewater 114 to flow around the supports 210 or the supports 210 may include through holes (not shown) that allow wastewater 114 to flow through the supports 210.

Though the supports 210 are illustrated in FIGS. 6A and 6B as having a circular cross-section, the supports 210 can be any reasonable shape. For example, the supports 210 may have a square, rectangular or triangular cross-section. The supports 210 may be positioned upstream of the wastewater flow 112 as illustrated or the supports 210 may be positioned downstream of the wastewater flow 112.

Figure 7:
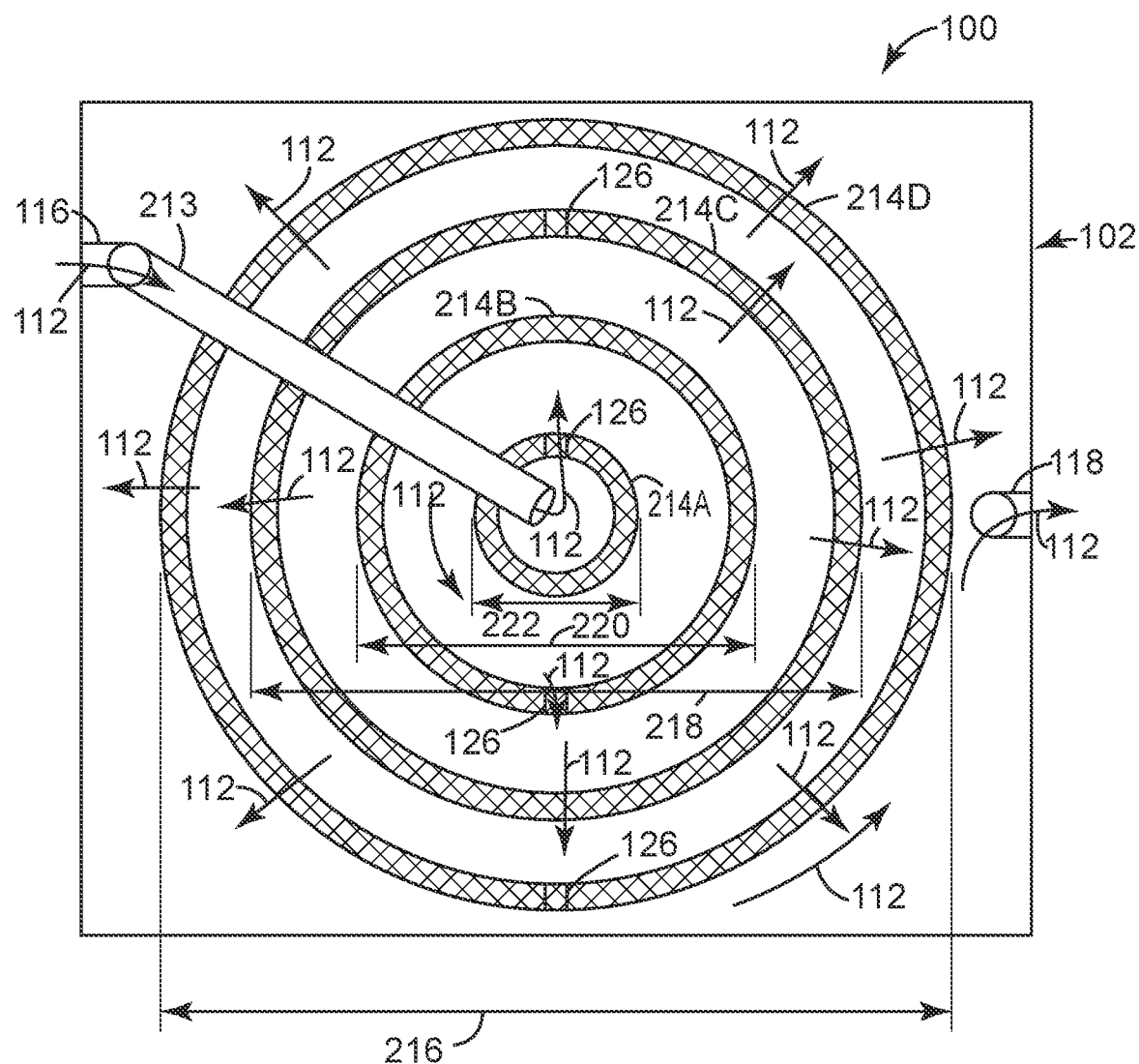
FIG. 7 depicts an example of a top view of a septic tank filter system having a tank and a plurality of substantially concentric circular first filters disposed therein, according to aspects described herein.

Referring to FIG. 7, an example is depicted of a top view of another embodiment of a septic tank filter system 100 having a tank 102 and a plurality of substantially concentric circular first filters 214A, 214B, 214C, 214D (collectively 214A-D) disposed therein, according to aspects described herein. The circular first filters 214A-D are a subset of the first filter 104 and have the same form and function as the first filter 104 as illustrated in FIG. 1C. Accordingly, like features on the first filter 104 of FIG. 1C and the circular first filters 214A-D of FIG. 7 will be referred to herein with the same reference numbers. An important difference between the circular first filters 214A-D and first filter 104 is that the first frame 122 of circular first filter 214 must have a circular shape, whereas the first frame 122 of first filter 104 does not necessarily have a circular shape.

The inlet 116 of the tank 102 is in fluid communication with the center of the tank 102 via a tube or pipe. Accordingly the inlet 116 directs wastewater 114 to flow first to the center of the tank and into the center of the smallest diameter circular first filter 214A. All other aspects of the tank 102 and first filters 214A-D remain the same. More specifically, the inlet 116 is located on the tank 102 above the outlet 118. Additionally the bottom 132 of the top opening 126 of the first filters 214A-D is located in the tank 102 such that it is above the outlet 118 and below the inlet 116.

The plurality of circular first filters 214A-D are positioned in the tank 102 such that the flow 112 of wastewater 114 flows through each circular filter 214A-D of the plurality of circular first filters 214A-D. Each circular first filter 214A-D has a substantially circular shape. Additionally, a circular first filter 214A-D of the plurality of first filters 214A-D is larger in diameter than, and substantially concentric to, an adjacent upstream first filter 214A-D.

For example, the diameter 216 of circular first filter 214D is larger than the diameter 218 of its adjacent upstream circular first filter 214C. Additionally, the diameter 218 of circular first filter 214C is larger than the diameter 220 of its adjacent upstream circular first filter 214B. Finally, the diameter 220 of circular first filter 214B is larger than the diameter 222 of its adjacent upstream circular first filter 214A.

The wastewater 114 flows 112 from the smallest diameter circular first filter 214A to the largest diameter circular first filter 214D. Additionally, top opening (or weir) 126 of a circular first filter 214A-D of the plurality of circular first filters 214A-D is positioned substantially 180 degrees from a top opening 126 of an adjacent upstream circular first filter 214A-D. Accordingly, when the filters 214A-D are not clogged, the wastewater flows 112 through the first filter media 122 of each circular first filter 214A-D from the smallest diameter first filter 214A to the largest diameter first filter 214D. However, when the filters are clogged or substantially clogged, the wastewater 114 flows 112 first over the top opening 126 of each filter 214, then traverses in a circular path for about 180 degrees to flow over the top opening 126 of the next filter 214.

By way of an example, in the circular first filters 214 illustrated in FIG. 7, the first filters 214A and 214B are shown as being clogged or substantially clogged. The first filters 214C and 214D are shown as being unclogged. Accordingly, the flow 112 of wastewater flows over the top openings (or weirs) 126 of both circular first filters 214A and 214B, but not through the filter media 124 of the clogged filters 214A and 214B. However, once the wastewater flows past filter 214B and into the unclogged filter 214C, the wastewater 114 may flow 112 radially through the filter media 124 of filters 214C and 214D and may not flow over the top openings 126 of the unclogged filters 214C and 214D.

The semicircular flow, and extensive filter media 124 surface area, of the circular filters 214A-D advantageously promotes the growth of anaerobic microbes and further promotes the digestion of the waste material 128 by those anaerobic microbes to further clean the wastewater prior to exiting the outlet 118 of the tank 102.

Figure 8:
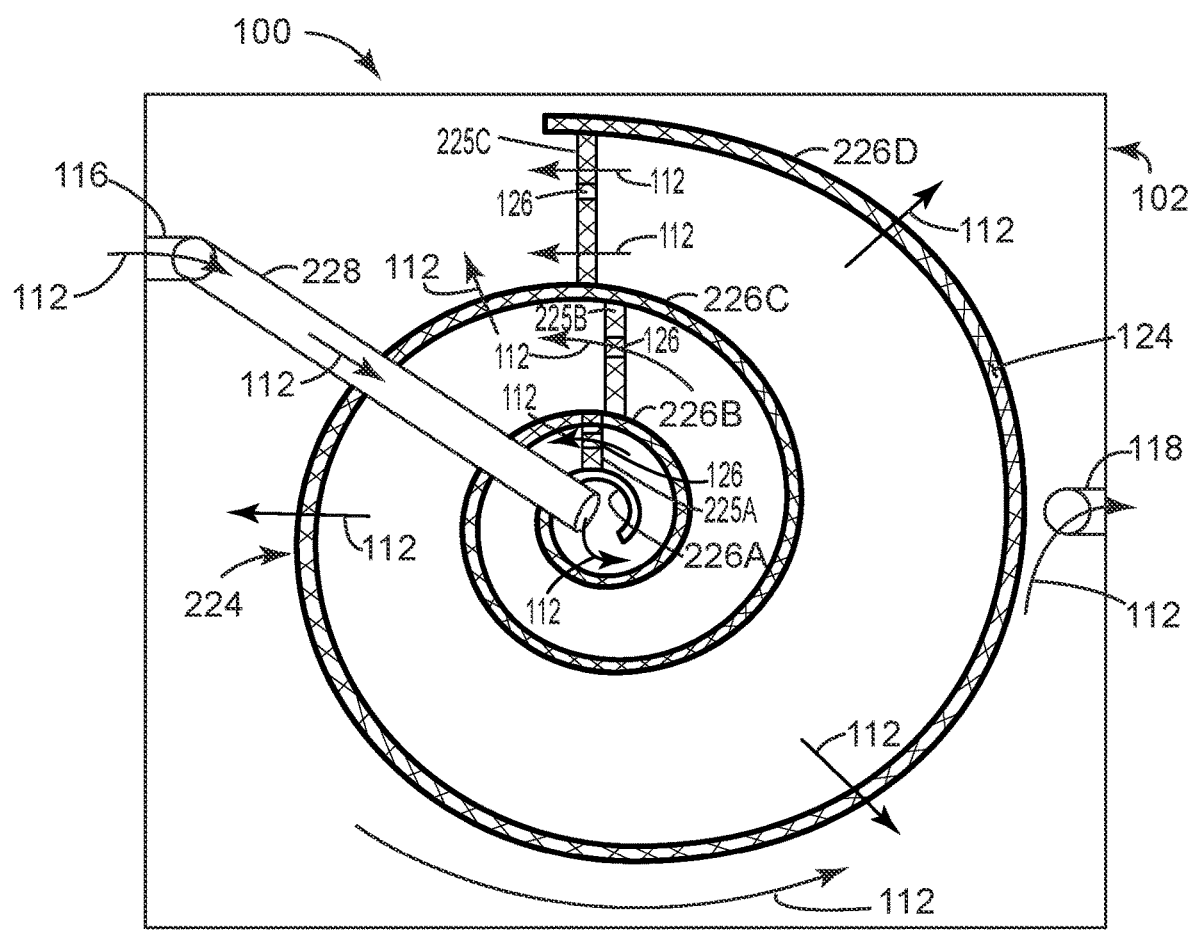
FIG. 8 depicts an example of a top view of a septic tank filter system having a spiral filter and a plurality of first baffles disposed between coil segments of the filter, according to aspects described herein.

Referring to FIG. 8, an example is depicted of a top view of another embodiment of septic tank filter system 100 wherein the first filter is a spiral filter 224 having a plurality of first baffles 225A, 225B, 225C (collectively 225A-C) disposed between a plurality of coil segments 226A, 226B, 226C, 226D (collectively 226A-D) of the filter 224, wherein a plurality of top openings (or weirs) 126 are disposed in the top portion of each first baffle 225A-C, according to aspects described herein. The spiral shaped filter 224 is positioned in the tank 102. The inlet 116 of the tank 102 is in fluid communication with the center of the tank 102 via a tube or pipe 228 Accordingly, the inlet 116 directs wastewater 114 to flow 112 into the center portion of the tank 102. All other aspects of the septic tank filter system 100 remain the same. More specifically, the inlet 116 is located on the tank 102 above the outlet 118. Additionally, the bottoms 132 of the top openings 126 of the first filter 224 are all located in the tank 102 such that they are above the outlet 118 and below the inlet 116.

The example of the septic filter system 100 illustrated in FIG. 8 includes the first filter 104 being a type of spiral filter 224. The spiral filter 224 includes a first frame (or first filter frame) 122, a first filter media 124, a plurality of baffles 225A-C and top openings 126 disposed in the upper portions of each baffle 225.

The first frame 122 comprises a first frame 122 similar to that illustrated in FIG. 1C but having a spiral shape. The spiral shaped first frame 122 comprising a plurality of coil segments 226A, 226B, 226C and 226D (generally individually 226, collectively 226A-D) winding outwardly from a smallest coil segment 226A positioned in a central section of the tank to a largest coil segment 226D positioned proximate a sidewall of the tank 102. The first filter media 124 (see FIG. 1C) is disposed on each coil segment 226A-D of the first frame 122. A plurality of baffles 225A, 225B and 225C (generally individually 225, collectively 225A-C) are positioned between adjacent coil segments 226A-D of the first frame 122. The top opening 126 (see FIG. 1C) includes a plurality of top openings 126. Each top opening 126 of the plurality of top openings 126 is disposed on a top portion of each baffle 225 of the plurality of baffles 225A-C. The tank inlet 116 is configured to direct the flow 112 of wastewater 114 to the smallest coil segment 226A.

When the first filter media 124 of any one coil segment 226 of the plurality of coil segments 226A-D is not clogged, the wastewater 114 flows 112 radially through the first filter media 124 of the any one coil segment 226 and the level of the wastewater 114 remains below the top opening 126 of the baffle 225 associated with the any one coil segment 226. When the first filter media 124 of any one coil segment 226 of the plurality of coil segments 226A-D is clogged, the wastewater 114 flows 112 in a rotational direction of the any one coil segment 226 and the level of the wastewater 114 rises until the wastewater flows 112 over the top opening 126 of the baffle 225 associated with the any one coil segment 226.

More specifically, in the example illustrated in FIG. 8, the three innermost coil segments 226A, 226B and 226C of spiral filter 224 are shown as being clogged or substantially clogged. The outermost coil segment 226D is shown as being unclogged. Accordingly, because the three coil segments 226A-C are clogged, the flow 112 of wastewater is directed by the clogged spirals 226A-C in a rotational direction, and the level of the wastewater has risen high enough so that the wastewater flows over the top openings 126 of the baffles 225A and 225B associated with the three coil segments 226A-C. However, because the outermost coil segment 226D is unclogged, the wastewater flows radially through the first filter media 124 of (i.e., disposed on) the coil segment 226D and the level of wastewater stays low enough so that the wastewater does not flow over the top opening 126 of the baffle 225C associated with the outermost coil segment 226D.

In the example illustrated in FIG. 8, the baffles 225A-C are illustrated as having filter media 124 disposed on them, and as being permeable, so that wastewater 114 can flow 112 through the baffles 225 if their associated filter media 124 is not clogged (see specifically unclogged baffle 225C). However, it is within the scope of this disclosure, that the baffles 225 can be solid, non-porous barriers, which do not allow wastewater to flow 112 through them and only allow wastewater to flow past them when the level of wastewater is high enough to flow 112 over the top opening 126 disposed in the top portion of the associated baffle 225.

Figure 9:
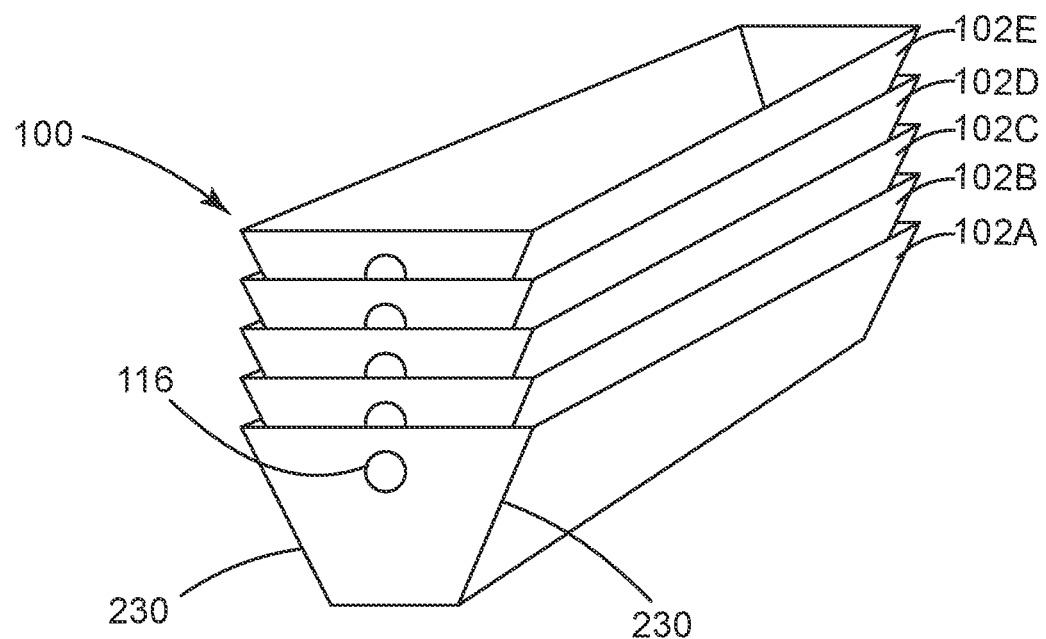
FIG. 9 depicts an example of a front view of a tank of the septic tank filter system, wherein the tank has tapered sidewalls, according to aspects described herein.

Referring to FIG. 9, an example is depicted of a perspective view of a stack of tanks 102A, 102B, 102C, 102D, 102E (generally individually 102 and collectively 102A-E) of the septic tank filter system 100, wherein the tanks 102A-E each have tapered sidewalls 230, according to aspects described herein. Accordingly, the tanks 102A-E each have a tapered shape, such that when transporting a plurality of the tanks 102A-E, a first tank 102A of the plurality of tanks 102A-E is operable to be stacked within a second tank 102B of the plurality of tanks 102A-E. Making the tanks 102A-E stackable advantageously reduces shipping costs of the tanks.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A septic tank filter system, comprising:
   a tank comprising an inlet and an outlet, wherein the outlet is disposed on the tank below the inlet to enable a flow of wastewater to be gravity fed from the inlet to the outlet; and
   a first filter positioned in the tank, the first filter comprising:
      a first frame,
      a first filter media disposed on the first frame, the first filter media operable to filter the wastewater of waste material as the wastewater passes therethrough, and
      a top opening disposed on a top portion of the first frame, wherein a bottom of the top opening is located above the tank outlet and below the tank inlet;
   wherein when the first filter media is not clogged, a level of the wastewater remains below the top opening; and
   wherein when the first filter media is clogged, the level of the wastewater rises until the wastewater flows over the top opening.

2. The septic tank filter system of claim 1, comprising:
   a plurality of first filters positioned in the tank such that the flow of wastewater flows sequentially through each filter of the plurality of first filters in a direction of the flow from the tank inlet to the tank outlet;
   wherein the filters of the plurality of first filters will clog sequentially in the direction of the flow of wastewater.

3. The septic tank filter system of claim 2, wherein the top openings of each adjacent filter of the plurality of first filters are located on opposing sides of the tank such that, as the filters are clogged sequentially, the wastewater will laterally flow back and forth across a portion of a width of the tank and over each adjacent top opening of the clogged filters.

4. The septic filter system of claim 1, comprising:
a plurality of sets of filters, wherein each set comprises a second filter, a third filter and the first filter, the plurality of sets of filters positioned in the tank such that the flow of wastewater flows sequentially though each set of filters in the plurality of sets of filters in a direction of flow from the tank inlet to the tank outlet;
wherein the second, third and first filters of each set of filters are positioned in the tank such that the wastewater flows sequentially from the second filter to the third filter and then to the first filter;
the second filter comprising:
  a second frame,
  a second filter media disposed on the second frame, the second filter media operable to filter the wastewater of waste material as the wastewater passes therethrough, and
  a second filter side opening disposed on a side of the second frame, wherein a bottom of the second filter side opening is located below the tank outlet;
the third filter comprising:
  a third frame,
  a third filter media disposed on the third frame, the third filter media operable to filter the wastewater of waste material as the wastewater passes therethrough, and
  a third filter side opening disposed on a side of the third frame, wherein a bottom of the third filter side opening is located below the tank outlet;
wherein when the second and third filters of each set of filters of the plurality of sets of filters are positioned in the tank, the second and third filter side openings are disposed on opposing sides of the tank such that the wastewater will laterally flow back and forth from second filter side opening to third filter side opening.

5. The septic filter system of claim 1, comprising:
the first frame being constructed of a resilient material and having a width that is greater than a distance between opposing sidewalls of the tank;
wherein the first frame is operable to be bowed upon insertion into the tank to frictionally fit between the opposing sidewalls of the tank to form a bowed first filter.

6. The septic filter system of claim 5, comprising:
a plurality of bowed first filters positioned in the tank such that the flow of wastewater flows sequentially through each first filter of the plurality of bowed first filters in a longitudinal direction from the tank inlet to the tank outlet;
wherein an extended portion of the first filter media extends beyond the first frame of each first filter; and
wherein the first frame of each first filter abuts against the extended portion of its associated first filter media or abuts against the extended portion of an adjacent first filter.

7. The septic filter system of claim 6, wherein the first frame of each first filter, which abuts against an extended portion of the first filter media, forms a substantially water-tight seal therebetween.

8. The septic filter system of claim 6, comprising:
a plurality of rows of supports disposed on a floor of the tank, the supports extending upwards from the floor of the tank, each row of the plurality of rows of supports forming an arcuate path across a width of the tank;
wherein each filter of the plurality of bowed filters conforms to a row of supports of the plurality of rows of supports.

9. The septic filter system of claim 1, comprising:
a plurality of first filters positioned in the tank such that the flow of wastewater flows through each filter of the plurality of first filters;
wherein each filter of the plurality of first filters has a substantially circular shape;
wherein a filter of the plurality of first filters is larger in diameter than, and substantially concentric to, an adjacent upstream first filter; and
wherein wastewater flows from the smallest diameter first filter to the largest diameter first filter.

10. The septic filter system of claim 9, wherein a top opening of a filter of the plurality of first filters is positioned substantially 180 degrees from a top opening of an adjacent upstream first filter.

11. The septic filter system of claim 1, comprising the tank having a tapered shape, such that when transporting a plurality of the tanks, a first tank of the plurality of tanks is operable to be stacked within a second tank of the plurality of tank.

12. The septic filter system of claim 1, wherein the tank is a secondary processing tank that receives the wastewater from a primary septic tank of a septic tank system.

13. The septic filter system of claim 1, comprising:
wherein the waste material that is filtered out of the wastewater promotes the growth of primarily anaerobic microbes on the first filter media; and
wherein the growth of the anaerobic microbes causes the first filter to clog over a period of time such that the wastewater no longer passes through the first filter media.

14. The septic filter system of claim 1, wherein the septic filter system is devoid of any forced air being pumped through the wastewater to promote the growth of aerobic microbes.

15. The septic filter system of claim 1, comprising:
a plurality of rows of first filters positioned substantially parallel to each other in the tank, each row comprising a plurality of first filters, each row receiving a portion of the flow of wastewater from the tank inlet and directing the same portion of the flow of wastewater to the tank outlet, each adjacent row being separated by one or more inner tank walls such that any wastewater in one row is not in fluid communication with wastewater in another row;
wherein the filters of the plurality of first filters in each row will clog sequentially in the longitudinal direction of flow.

16. The septic filter system of claim 1, comprising:
the first filter comprising a spiral filter wherein:
  the first frame comprises a spiral shaped first frame, the first frame comprising a plurality of coil segments winding outwardly from a smallest coil segment positioned in a central section of the tank to a largest coil segment positioned proximate a sidewall of the tank,
  the first filter media disposed on each coil segment of the first frame,
  a plurality of baffles positioned between adjacent coil segments of the first frame, and the top opening being a plurality of top openings, each top opening of the plurality of top openings being disposed on a top portion of each baffle of the plurality of baffles; and the tank inlet being configured to direct the flow of wastewater to the smallest coil segment;

wherein when the first filter media of any one coil segment of the plurality of coil segments is not clogged, the wastewater flows radially through the first filter media of the any one coil segment and the level of the wastewater remains below the top opening of the baffle associated with the any one coil segment; and wherein when the first filter media of any one coil segment of the plurality of coil segments is clogged, the wastewater flows in a rotational direction of the any one coil segment and the level of the wastewater rises until the wastewater flows over the top opening of the baffle associated with the any one coil segment.

17. A septic filter system, comprising:

a tank comprising an inlet and an outlet, wherein the outlet is disposed on the tank below the inlet to enable a flow of wastewater to be gravity fed from the inlet to the outlet; and a plurality of first filters positioned in the tank such that the flow of wastewater flows through each filter of the plurality of first filters, each first filter of the plurality of first filters comprising:

a first frame, a first filter media disposed on the first frame, the first filter media operable to filter the wastewater of waste material as the wastewater passes therethrough, and a top opening disposed on a top portion of the first frame, wherein a bottom of the top opening is located above the tank outlet and below the tank inlet;

wherein when the first filter media of a one of the first filters of the plurality of first filters is not clogged, a level of the wastewater remains below the top opening of the one of the first filters; and wherein when the first filter media of a one of the first filters of the plurality of first filters is clogged, the level of the wastewater rises until the wastewater flows over the top opening of the one of the first filters.

18. The septic filter system of claim 17, wherein the top opening of each adjacent filter of the plurality of first filters are located on opposing sides of the tank such that, as the filters are clogged sequentially, the wastewater will laterally flow back and forth across a portion of a width of the tank and over each adjacent top opening of the clogged filters.

19. The septic filter system of claim 17, comprising:

the first frame of each filter of the plurality of first filters being constructed of a resilient material and having a width that is greater than a distance between opposing sidewalls of the tank;

wherein the first frame of each first filter of the plurality of first filters is operable to be bowed upon insertion into the tank to frictionally fit between the opposing sidewalls of the tank to form a plurality of bowed first filters;

wherein an extended portion of the first filter media extends beyond the first frame of each bowed first filter of the plurality of bowed first filters; and wherein the first frame of each bowed first filter abuts against the extended portion of its associated first filter media or abuts against the extended portion of the first filter media of an adjacent bowed first filter of the plurality of bowed first filters.

20. The septic filter system of claim 17, comprising:

a plurality of sets of filters comprising a second filter, a third filter and the first filter, the plurality of sets of filters positioned in the tank such that the flow of wastewater flows sequentially though each set of filters in the plurality of sets of filters in a longitudinal direction from the tank inlet to the tank outlet;

wherein the second, third and first filters of each set of filters are positioned in the tank such that the wastewater flows sequentially from the second filter to the third filter and then to the first filter;

the second filter comprising:

a second frame, a second filter media disposed on the second frame, the second filter media operable to filter the wastewater of waste material as the wastewater passes therethrough, and a second filter side opening disposed on a side of the second frame, wherein a bottom of the second filter side opening is located below the tank outlet;

the third filter comprising:

a third frame, a third filter media disposed on the third frame, the third filter media operable to filter the wastewater of waste material as the wastewater passes therethrough, and a third filter side opening disposed on a side of the third frame, wherein a bottom of the third filter side opening is located below the tank outlet;

wherein when the second and third filters of each set of filters of the plurality of sets of filters are positioned in the tank, the second and third filter side openings are disposed on opposing sides of the tank such that the wastewater will laterally flow back and forth from second filter side opening to third filter side opening.

* * * * *